May 18, 1954 H. B. REYNOLDS 2,679,000

NOISE SQUELCH SYSTEM FOR FREQUENCY MODULATION RECEIVERS

Filed Jan. 13, 1949

Inventor

Harold B. Reynolds

By Clarence A. O'Brien and Harvey B. Jacobson

Attorneys

Patented May 18, 1954 2,679,000

UNITED STATES PATENT OFFICE 2,679,000

NOISE SQUELCH SYSTEM FOR FREQUENCY MODULATION RECEIVERS

Harold B. Reynolds, Oneida, N. Y.

Application January 13, 1949, Serial No. 70,664

4 Claims. (Cl. 250—20)

This invention relates to a noise squelch or muting system for angle modulation receivers and it has for its main object to provide an automatic method and means for suppressing the output of the radio receiver during periods of low signal to noise ratio or during periods in which the signal has faded out or has been cut off.

The expression "angle modulated" receiver or carrier wave in intended to include frequency modulated and phase modulated systems and systems having the characteristics of both above named systems.

The main purpose of squelch or muting systems, as well known, consists in making the operation or the output of the receiver dependent on a predetermined value of the signal or of the signal to noise ratio, so that when the incoming signal decreases in strength and drops below a threshold value or fades out, the receiver does not operate and the audio amplifier stage will draw no current, although it will remain in a condition of readiness.

The known noise squelch or muting systems for angle modulated carrier wave receivers usually either use for this purpose the discriminator rectified network output voltage or the grid current flowing in the limiter grid circuit, in order to produce the noise control, and they exercise the control by influencing the grid bias of the amplifier. However, these methods have not been sufficiently sensitive, reliable and efficient, and they have not been effective in suppressing short duration impulse noises.

It is therefore an object of the present invention to prevent reproduction of noise and of amplitude modulation in general in the radio receiver during periods of a low signal to noise ratio or during the fading of the signal by making the operation of the receiver dependent on the tripping of a relay which is only operated when the signal to noise ratio is above a certain predetermined value.

It is a further object of the invention to prevent amplitude modulated noise of large volume in the modulation output of a FM or PM receiver, by providing a noise squelch or muting circuit in which both the signal voltage and the amplitude modulated voltage influence the circuit controlling the output amplifier in the opposite sense, thus making the action of the circuit dependent on the relative strength of the signal and of the noise or amplitude modulation.

It is a further object of the invention to provide a noise squelch or muting system including a relay, an amplifier controlled by said relay, and a squelch circuit provided with rectifying means in which the voltage developed by the FM signal carrier and the voltage developed by amplitude modulation, which are both developed across rectifying means, are made to oppose each other, while the current through the relay is made dependent on the resultant of the two oppositely directed voltages, so that the relay is only operated at a definite signal to noise ratio which permits reception of the signal.

It is a further object of the invention to improve angle modulation receivers by using a noise squelch circuit preventing operation of the receiver when the signal to noise ratio exceeds a predetermined value, said circuit including rectifying means, an amplifier controlled by the voltage developed across the rectifying means, and a relay controlled by the amplifier and controlling the output of the receiver, the voltage developed across one of the rectifying means, which is dependent on the FM signal carrier and on the amplitude modulation of said carrier, influencing the amplifier, and the amplified amplitude modulation being made to develop, across a second rectifying means, a voltage opposing the first voltage, thus preventing the relay and the receiver from operating whenever the amplitude modulation exceeds a certain value.

It is a still further object of the invention, when carrying out the above explained principle, to use the discriminator rectifiers of the receiver as the first rectifying means of the noise squelch circuit.

Other objects of the invention will be apparent from the detailed specification. The invention is illustrated in the accompanying drawings showing two modifications thereof. It is however to be understood that these modifications are shown merely by way of example in order to explain the principle of the invention and the best mode of applying this principle. It will be obvious to those conversant with this art that the operation, as described, is not bound to the structural elements or connections shown in the drawings and modifications of the embodiments of the invention shown are therefore not necessarily departures from the invention.

Figure 1:
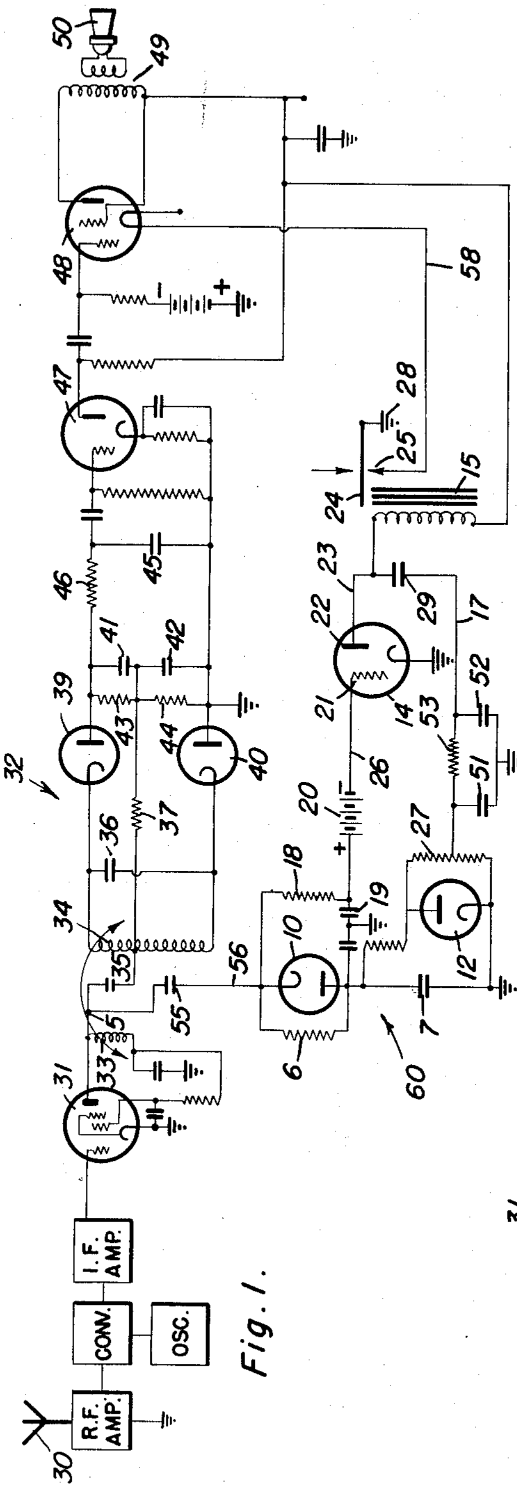
Figure 1 is a diagram of the connections of one modification of the invention.

The principle on which the noise squelch system according to this invention is based is preferably explained with reference to Figure 3 of the drawings. It will be clear to the expert, conversant with this art, that in receivers for angle modulated carrier waves, such as FM or PM waves, the responsiveness of the receiver should be limited to the ratio of change of the angle of the incoming waves or, in other words, to the relative frequency variation of the wave and that this responsiveness should not be extended to amplitude variations and especially to relatively large amplitude variations. Accordingly, receivers of this type always include a device, usually termed limiter, for suppressing amplitude variations which exceed a predetermined value and which are mainly caused by static or by noise impulses, or, as in a radio operating on a car, for instance, by waves produced by the ignition sparks, by the brushes of the generator or the like.

The limiter consists of one or more amplifier stages operated under conditions of low gain per stage, so that the stage will overload when a signal of some magnitude is applied to it.

Behind the limiter and in front of the discriminator of the set, preferably at a point of high output, the noise squelch circuit according to this invention is arranged. It is based on the principle that the operation of the set and more particularly the operation of the audio amplifier which in its turn operates a speaker, is preferably made dependent on the noise to signal ratio. Whenever the limiter is no longer capable of holding off or suppressing the amplitude modulation of the carrier wave so as to prevent it to act on the receiver, the set is shut off as, manifestly, the signal to noise ratio has become so unfavorable that no reception can take place anymore. The means for controlling the said audio amplifier is a relay controlled by the noise squelch circuit. This relay according to the invention, acts on one of the operative circuits of the audio amplifier. As long as a pure carrier wave enters the noise squelch circuit or as long as the signal to noise ratio is favorable, this relay is operative and holds the audio amplifier in its operative position. However, as soon as a carrier wave penetrates into the noise squelch circuit which is amplitude modulated beyond a certain degree, the relay is de-energized and the audio amplifier is cut out.

To perform this function the noise squelch circuit must develop an operative voltage, acting on the relay which is dependent on the signal strength and on the amplitude modulation and the voltages derived from these sources must act in an opposite sense so that the voltage produced by the signal carrier is opposed by the voltage produced by amplitude modulation in the operative relay circuit. As long as the resultant of the two opposing voltages is close to zero or is of a small value or, to express it otherwise, as long as the signal strength is not preponderant and does not exceed the signal due to amplitude modulation of the carrier, the squelch circuit relay is not operated and the audio amplifier of the receiver, whose operation depends on this relay, remains inoperative. However when the desired preponderance of the FM signal is achieved by a sufficient elimination of the amplitude modulation the relay is operated and the audio amplifier of the receiver goes into action.

Figure 3:
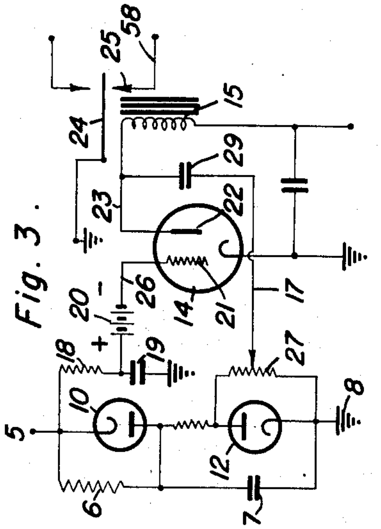
Figure 3 is a diagram of the squelch circuit used to illustrate the principle on which the invention is based.

To explain the system in detail with reference to Figure 3 showing merely the noise squelch circuit, it may first be mentioned that said circuit is joined to the FM and PM receiver at a suitable point, indicated at 5.

Theoretically the incoming wave should be a pure carrier wave, which does not show any amplitude modulation or which shows such a modulation only to a small degree. This is practically the case, when the amplitude modulation does not exceed the degree which can be treated and eliminated by the limiter. As long as the limiter succeeds in eliminating undesirable amplitude modulation, the signal to noise ratio will be sufficient for reception.

The incoming wave in this case enters at 5 and passes to the rectifier 10, formed in the example shown by a diode, across which a positive voltage is developed which is filtered by means of resistance 18 and condenser 19. The voltage developed across resistance 18 acts on the grid bias circuit 26 through the grid bias battery 20 of amplifier tube 14 and influences the voltage on the grid of the tube 14. A current therefore is developed which flows in the plate circuit 23 containing the relay 15 which is energized and operates its armature 24. The armature closes the circuit 58 by its contact with the fixed contact 25 and as circuit 58 is one of the operative circuits of the audio amplifier of the receiver the closure of the relay circuit 23 makes the audio amplifier operative.

If static disturbances, spark produced damped waves or other amplitude modulated oscillations have produced an amplitude modulation of the carrier wave, or, if the signal modulating the carrier wave has been shut off or has faded out so as to cause a preponderance of the amplitude modulation relative to the signal, the noise squelch circuit must be active to cut out the audio amplifier by de-energizing relay 15.

The incoming wave in this case has not been purged of amplitude modulation in the limiter, because the saturation limit of the limiter has been reached.

The wave entering point 5 is therefore amplitude modulated and the amplitude modulation passes on, along with the signal, through the grid bias circuit 26 to the tube 14 and is amplified and will appear in the plate circuit 23 of the tube. The amplitude modulation in this case passes through circuit 17 to potentiometer 27 and to the rectifier 12 which, in this case, is also a diode, across which a voltage is developed. The rectifier diode is however so arranged in the circuit that the voltage which is developed is negative. This voltage passes on through resistance 6 to the grid bias circuit 26 and counteracts the positive voltage produced across the rectifier diode. The result is that merely the difference between the voltages is active in the grid bias circuit which is insufficient to produce a plate current capable of keeping the relay 15 in its operative position. The relay therefore falls back, cutting out the audio amplifier as long as the signal has been cut out or has faded out, or as long as the noise component is preponderant and would prevent reception of the signal.

Figure 2:
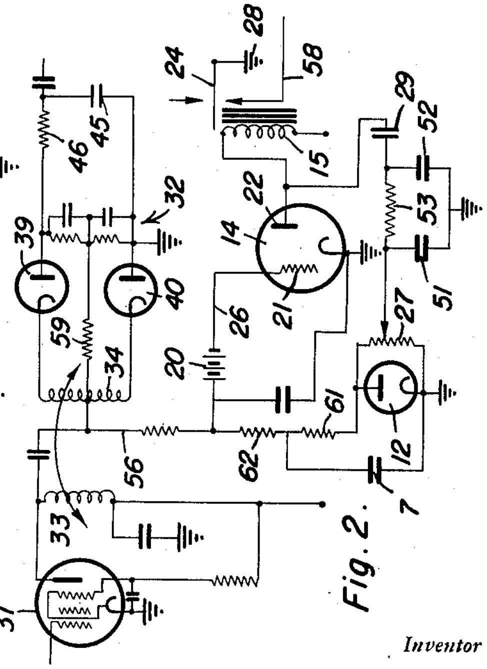
Figure 2 is a diagram of the connections of a further modification of the invention.

The two modifications of a receiver, provided with a noise squelch circuit according to the invention and shown in Figures 1 and 2 of the drawings will now be readily understood.

Referring first to Figure 1 it will be clear to those conversant with this art that the receiver shown is of standard construction. The receiver is of the superheterodyne type in which the waves, picked up by the antenna 30, are first amplified and then pass the converter connected with the local oscillator. Behind the converter an I. F. amplifier is arranged as usual which is connected with the limiter 31 operating in the well known manner, which has been briefly described above. The limiter may include several amplifier stages, although merely one stage is shown. Behind the limiter 31 the discriminator 32 is arranged which is this case, consists of the two coils 33, 34 coupled with each other, the condensers 35, 36, the resistance 37 and the rectifying and demodulating diodes 39, 40 in the output circuits of which the condensers 41, 42 and the resistance 43, 44 are arranged.

The FM is demodulated in this unit and the demodulated currents developed across 41, 42, 43, 44 pass through the deemphasis network 45, 46 to a first audio amplifier 47 and to a second audio amplifier 48 connected with the output transformer 49 acting on the speaker 50.

What has been described is one of the conventional FM receivers, the construction and operation of which is part of the known art with which the expert is familiar and no further description of this receiver is therefore necessary.

Attention is however directed to the fact that the audio amplifier 48 has one of its operative circuits, for instance, the filament circuit, controlled by contact 25 of relay 15. The circuit is only completed and connected with ground 28 or a return line when the relay 15 attracts its armature.

At the point 5, located at the discriminator input or at any other point of high output, the noise squelch circuit generally indicated at 60 is connected with the receiver. Its elements have already been described and they can be readily identified by reference to the description of Figure 3. A low pass filter 51, 52, 53 in the circuit 17 has however been added in this case, for the purpose of preventing amplitude modulations which are produced by overdeviation of a true FM signal from opening the circuit.

It will also be noted that a condenser 55 has been inserted. This condenser together with condenser 7 is intended to filter the output of the rectifier 12, so that its voltage is as nearly constant as possible, in order to prevent the relay 15 from chattering.

It may also be mentioned that the resistance 6 is only necessary if gaseous tubes are used as rectifiers.

The operation of the squelch circuit is practically identical with that described in connection with Figure 3. Incoming FM signals, modulating the carrier wave, pass from point 5 through branch 56 and develop a positive voltage across the rectifier 10 manifesting itself across the terminals of the resistance 18 and acting on the grid bias circuit 26. The tube 14 therefore develops a plate current, acting on relay 15 which attracts its armature 24 and closes the circuit 58 of the audio amplifier 48 at the contact 25. The receiver is therefore in operative condition.

If, however, the carrier wave should be amplitude modulated by static, noises and the like which are produced to such an extent that they become prevalent or, if on account of the fading or cutting out of the FM signal this amplitude modulation should become predominant, it will be clear that the waves which pass between coils 33 and 34 will also enter branch 56 and pass through the tube 10. Therefore a positive voltage corresponding to the amplitude modulation will be developed across the diode which enters the grid circuit 26. These oscillations are amplified and pass into the plate circuit 23 and through the condenser 29 and through the low pass filter 51, 52, 53 to the voltage dividing potentiometer 27. They therefore also pass through the diode 12 and are rectified so as to produce a negative voltage which through resistance 6 passes onto the grid circuit 26 and which is in series with the positive voltage produced across 18. Therefore the grid bias voltage cannot rise and is kept down, the current flowing through the tube 14 is cut off or is kept at a small value and the relay 15 is not provided with sufficient current to keep the armature 24 attracted. The armature 24 will therefore return into its position of rest and the energizing circuit 58 for the audio amplifier is interrupted.

The modification of the receiver shown in Figure 2 is similar to that shown in Figure 1 in most respects and therefore only the middle portion of the receiver with the limiter 31, the discriminator 32, and the de-emphasis network is shown in the figure, the other elements of the receiver being identical with those shown in Figure 1.

As shown, this modification dispenses with rectifier 10 and makes the diodes 39, 40 perform the duty of this rectifier 10.

The FM signal in this case develops a positive voltage across the two rectifier diodes 39, 40 in the resistance 59 which voltage is passed on through branch 56 and enters the grid bias circuit 26, thereby causing a current flow through the amplifier tube 14, operating the relay 15 in the manner described.

If however a carrier wave with predominant amplitude modulation leaves the limiter and passes on to the discriminator the amplitude modulation will also enter circuit 56 and will act on the grid circuit 26 producing in the tube 14 a plate current which is strongly amplitude modulated. This amplitude modulation is passed through condenser 29 to the potentiometer 27 over the low pass filter 51, 52, 53 and by means of the diode 12 a negative voltage is developed which enters the grid circuit 26 passing through the resistances 61, 62. It therefore counteracts the positive voltage which has been developed in the circuit 26 and produces a decrease of the plate current and the de-energization of the relay 15, thus causing the falling back of the armature 24 and the opening of the circuit 58 of the audio amplifier 48.

It is to be noted that while the rectifier diodes in the conventional circuit and also in the circuit shown in Figure 1 may be inserted in any way which is thought fit, the modification shown in Figure 2 is only operative when the diodes 39, 40 are connected in such a way that a positive voltage is developed at the end of resistance 59.

It will be understood that some of the conventional constructive details have not been shown and described and that unit elements and connections which are unessential for the application of the principle may be changed without departing from the invention.

Having described the invention, what is claimed as new is:

1. A noise squelch system for an angle modulation receiver, including a limiter and a discriminator and circuits connecting the output of the former to the input of the latter, said receiver including a disconnectable audio amplifier, said system comprising a relay controlling the disconnectable audio amplifier, making it inoperative when de-energized, an amplifying tube provided with a grid and an anode, a grid circuit and an anode circuit, said tube controlling the operation of said relay, a noise squelch circuit connected on one side to said grid and on the other side to a point of the circuits connecting the output of the limiter to the input of the discriminator, means for producing a first control voltage in said noise squelch circuit acting on the grid of and controlling the flow of currents through said amplifying tube, said means including a rectifier connected to the above named point of the limiter-discriminator circuits, rectifying the currents produced by the carrier waves entering said noise squelch circuit, means for producing a second control voltage in said noise squelch circuit, said means including the anode circuit of the tube and also including a further rectifier, said further rectifier being so arranged that the second control voltage developed across the further rectifier opposes the said first control voltage, the second control voltage being produced when amplitude modulated signals pass from the limiter to the discriminator and enter the noise squelch circuit, are amplified and appear in the anode circuit which is connected with a point of the noise squelch circuit, the said second control voltage bringing the biasing voltage of the grid to the cut-off point and thus de-energizing the amplifier relay.

2. A noise squelch system for angle modulation receivers including a limiter and a discriminator and circuits connecting the output of the limiter to the input of the discriminator, and further including a disconnectable audio amplifier, said system comprising a relay controlling the disconnectable audio amplifier, making it inoperative when de-energized, an amplifying tube provided with a grid and an anode, controlling the operation of said relay, a control means for said amplifying tube including a noise squelch circuit with an input branch connected to a point of the circuits which connect the limiter and the discriminator, said noise squelch circuit leading to the grid of the amplifying tube, means for rectifying the current entering the noise squelch circuit at the point of connection to the circuits between the limiter and discriminator, said rectifying means delivering a rectified voltage to the grid of the amplifer tube, a circuit connected to the anode of the amplifier tube, a further rectifying means in the last named circuit, said further rectifying means delivering a voltage to the input branch of the noise squelch circuit opposed to the voltage delivered to the grid of the tube by the first named rectifying means, the latter producing a voltage sufficient to pass a current through the amplifying tube keeping the relay energized, while a current carrying amplitude modulation of the carrier waves, passing the limiter and entering the noise squelch circuit produces an anode current which, when rectified, reduces the voltage applied to the grid to the cut-off point, thereby de-energizing the relay.

3. A noise squelch system for angle modulation receivers including a limiter, a discriminator, and circuits connecting the output of the limiter to the input of the discriminator, and further including a disconnectable audio amplifier, said system comprising a relay controlling the disconnectable audio amplifier and making it inoperative when de-energized, an amplifying tube provided with a grid, an anode, an anode circuit, and a grid circuit, controlling the operation of the relay, and maintaining a grid bias adapted to pass currents through the amplifier tube, thus keeping the relay energized, control means for said amplifying tube, including a noise squelch circuit having an input branch connecting a point of the input circuit of the discriminator to the grid circuit of the amplifying tube, rectifying means for rectifying any voltage appearing in said input branch during the passage of the carrier waves, means for applying said rectified voltage to the grid circuit, said rectified voltage determining the cut-off grid bias, a feed back circuit inserted between the anode circuit and the input branch of the noise squelch circuit, connected with the grid circuit, a second rectifying means in said feed back circuit of the amplifying tube, delivering a rectified voltage to the input branch of the noise squelch circuit and to the grid of the amplifying tube, opposed to the voltage delivered by the first named rectifying means, said anode circuit upon passage of an excess current through the amplifier tube due to an amplitude modulation passing the limiter end penetrating into the noise squelch circuit, thus carrying currents which after rectification reduce the grid bias voltage substantially cutting off the passage of current through the amplifier tube and de-energizing the relay controlled by it.

4. A noise squelch system for angle modulation receivers including a limiter, a discriminator including a set of rectifiers and circuits connecting the output of the limiter and the input of the discriminator, and further including a disconnectable audio amplifier, said system comprising a relay controlling the disconnectable audio amplifier and making it inoperative when de-energized, an amplifying tube provided with a grid and an anode, an anode circuit and a grid circuit controlling the operation of the relay and cutting off the passage of the current when a predetermined grid voltage is applied, control means for said amplifying tube, including a noise squelch circuit with an input branch connected to the input circuit of the discriminator, a resistance across the rectifiers of the said discriminator, a connection between the end of this resistance and the noise squelch circuit, the above named rectified voltage of the discriminator thus determining the grid bias applied and maintaining it at a point at which currents pass through the amplifying tube, and keep the relay energized, a feed back connection between the anode circuit and the input branch of the noise squelch circuit, a further rectifying means in the said feed back connection, producing a rectified voltage which is opposed to the voltage produced in the resistance across said discriminator rectifier, said noise squelch circuit thus, upon passage of an excess current through the amplifier tube due to an amplitude modulation, penetrating into the noise squelch circuit carrying currents which, when rectified, reduce the original grid bias voltage of the tube to a cut-off value in which the passage of current through the amplifying tube is substantially suppressed and the relay controlled by said tube is de-energized.

References Cited in the file of this patent

UNITED STATES PATENTS

| Number | Name | Date |
|---|---|---|
| 2,028,859 | Barton | Jan. 28, 1936 |
| 2,070,900 | Harris | Feb. 16, 1937 |
| 2,261,643 | Brown | Nov. 4, 1941 |
| 2,279,819 | Fyler | Apr. 14, 1942 |
| 2,343,115 | Noble | Feb. 29, 1944 |
| 2,370,216 | Worcester Jr. | Feb. 27, 1945 |
| 2,372,934 | Campbell | Apr. 3, 1945 |
| 2,400,948 | Peterson | May 28, 1946 |
| 2,438,501 | Hings | Mar. 30, 1948 |
| 2,452,436 | Crosby | Oct. 26, 1948 |
| 2,455,450 | Thompson | Dec. 7, 1948 |